United States Patent
Breuer et al.

(10) Patent No.: US 6,871,491 B2
(45) Date of Patent: Mar. 29, 2005

(54) COMBUSTION SYSTEM HAVING AN EMISSION CONTROL DEVICE

(75) Inventors: Norbert Breuer, Ditzingen (DE); Christian Schiller, Leinf.-Echterdingen (DE); Christelle Oediger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/430,106

(22) Filed: May 5, 2003

(65) Prior Publication Data

US 2003/0234011 A1 Dec. 25, 2003

(30) Foreign Application Priority Data

May 3, 2002 (DE) .......................................... 102 19 799

(51) Int. Cl.[7] .................................................. F01N 3/00
(52) U.S. Cl. ............................. 60/286; 60/295; 60/301; 60/303; 123/3
(58) Field of Search .......................... 60/274, 286, 295, 60/300, 301, 303; 12/1 A, 3, DIG. 12; 429/13, 19

(56) References Cited

U.S. PATENT DOCUMENTS

| | | | | |
|---|---|---|---|---|
| 3,986,350 A | * | 10/1976 | Schmidt | ...................... 60/274 |
| 4,750,453 A | * | 6/1988 | Valdespino | ...................... 123/3 |
| 5,921,076 A | * | 7/1999 | Krutzsch et al. | ............... 60/274 |
| 5,947,063 A | * | 9/1999 | Smith et al. | .................... 123/3 |
| 5,992,141 A | * | 11/1999 | Berriman et al. | ............. 60/274 |
| 6,122,909 A | * | 9/2000 | Murphy et al. | ................. 60/286 |
| 6,276,132 B1 | * | 8/2001 | Kanesaka et al. | ............. 60/286 |
| 6,311,650 B1 | * | 11/2001 | Lamm | .......................... 123/3 |
| 6,675,573 B2 | * | 1/2004 | Kempfer | ...................... 60/284 |
| 6,739,125 B1 | * | 5/2004 | Mulligan | ..................... 60/286 |
| 2003/0047146 A1 | * | 3/2003 | Daniel et al. | ................... 123/3 |

FOREIGN PATENT DOCUMENTS

| | | | |
|---|---|---|---|
| DE | 199 39 807 | 3/2001 | |
| EP | 0 487 886 | 4/1994 | |
| GB | 1 453 456 | 10/1976 | |
| JP | 02157464 A | * 6/1990 | .......... F02M/21/02 |
| WO | WO 02/08117 | 1/2002 | |

* cited by examiner

Primary Examiner—Tu M. Nguyen
(74) Attorney, Agent, or Firm—Kenyon & Kenyon

(57) ABSTRACT

A combustion system is for generating energy by the combustion of a fuel, using a combustion device, such as, for example, a gasoline or diesel engine. An emission control system is provided for converting exhaust gas components using an automotive fluid, by the use of which energy, that is relatively environmentally protective and made available for varied applications. At least one hydrogen generating unit is provided for converting the automotive fluid at least partially into an hydrogen-containing fuel.

25 Claims, 1 Drawing Sheet

COMBUSTION SYSTEM HAVING AN EMISSION CONTROL DEVICE

CROSS-REFERENCE TO RELATED APPLICATIONS

The present application claims priority to Application No. 102 19 799.7, filed in the Federal Republic of Germany on May 3, 2002, which is expressly incorporated herein in its entirety by reference thereto.

1. Field of the Invention

The present invention relates to a combustion device for generating energy by burning a fuel, having a combustion device and an emission control system.

2. Background Information

In line with the advancing state of knowledge, legal requirements, for the protection of health and the environment, which regulate the emission from motor vehicles or other combustion machines, are constantly being intensified. To fulfill these requirements, various different measures may be taken up, for example, for vehicles.

Up to now, for instance, even for exhaust-gas treatment, such as for lean exhaust gases of vehicles, the so-called "Selective Catalytic Reduction Method" (SCR method) may be used for the removal of nitrogen oxides ($NO_x$). In this connection, the reducing agent ammonia ($NH_3$), with nitrogen oxides of the exhaust gas, may be selectively converted to nitrogen and water. For instance, ammonia for performing the SCR method may be stored directly on board, using pressure liquefaction. There may be an attempt to generate $NH_3$ from a urea-water solution in a hydrolysis catalyzer upstream from the SCR catalyzer.

Beyond that, requirements such as increasing safety and/or luxury may increase, so that additional assemblies may establish themselves more and more, such as in motor vehicles. However, in order to fulfill their function, these respective assemblies may need electrical energy, which therefore may need to be additionally supplied. According to conventional methods, supplying the correspondingly required energy may be connected with an increase in fuel usage and/or emissions relevant to the environment.

SUMMARY

An example embodiment of the present invention may provide a combustion device for generating energy via the combustion of a fuel, having a combustion unit, such as, for example, a gasoline or diesel engine, and an emission control system for converting an exhaust gas component with an automotive fluid, using which, relatively environmentally protective energy may be supplied for various different applications.

According to an example embodiment of the present invention, the combustion device may include at least one hydrogen generating unit for converting the automotive fluid at least partially to a hydrogen-containing fuel.

With the aid of these exemplary measures, the first automotive fluid already present may be convertible into an hydrogen-containing fuel or rather, an additional, second automotive fluid and a residual material that may be as environmentally protective as possible. By using an appropriate storage unit, the generation of the hydrogen-containing fuel may be decoupled from its use, and stored in it temporarily.

Alternatively or in combination with this, an energetic conversion of the hydrogen-containing fuel may be provided. In an example embodiment of the present invention, at least one hydrogen utilization unit for utilizing the hydrogen-containing fuel may be provided. Hydrogen may be used energetically in various different manners, such as, for example, in an environmentally protective manner. For example, hydrogen may be utilized further energetically by using a catalytically active burner, a separate combustion engine or a fuel cell for the combustion of the hydrogen-containing fuel.

In the case of a combustion device according to an example embodiment of the present invention, a separate combustion engine may be provided for the combustion of the automotive fluid. By doing this, the automotive fluid may be utilized energetically in the alternative manner mentioned above.

To generate electrical energy, an electric generator may be connected to one of the separate internal combustion engines or the like. The electrical energy may, for example, be used to supply subsidiary assemblies of the vehicle. The hydrogen utilization unit may be configured as a fuel cell system for generating electrical energy so that, for example, a so-called auxiliary power unit system (APU system) may be implemented for the electrical supply of subsidiary assemblies of a vehicle, etc.

According to an example embodiment, at least one storage unit for storing electrical energy may be provided, so that a decoupling of the electrical energy generation from the energy use may be implemented. This may, for example, have the effect of a dimensioning of the process steps or systems components, just upstream, as, for instance, an automotive fluid supply, hydrogen generation, etc.

In an example embodiment of the present invention, the automotive fluid at least partially includes ammonia. Using this measure may make it possible to use the already usual, so-called SCR method in accordance with the present invention. Accordingly, one may revert to a method that has proven itself, including corresponding components, whereby operating safety may be improved and a particularly economically favorable development of the present invention may be implemented.

In an example embodiment of the present invention, at least one automotive fluid generating unit is provided for generating the automotive fluid from a starting substance. The separate automotive fluid generating unit may have a catalytically active configuration and/or a heating device for converting the starting substance into the automotive fluid. For example, the automotive fluid and/or the starting substance may be able to be at least partially converted to ammonia. The generation of the ammonia may be performed by the hydrolysis or thermolysis of the starting substance external to and/or internal to the exhaust branch.

The starting substance may be at least partially developed as a urea-water solution, solid urea, ammonium carbamate, isocyanic acid, etc. The starting substance may be jacketed by or mixed with a carrier substance for better handling. At least one storage device may be provided for storing the starting substance.

The mostly solid and/or liquid starting substances may be separated from the gaseous products, such as ammonia, carbon dioxide and/or water vapor, etc., using a separating device.

As an example, when using a urea-water solution (HWL), the automotive liquid generating unit may be implemented as a comparatively simply configured, heatable reaction chamber.

The hydrogen generating unit may include at least one heating device for heating the automotive liquid. With the aid of the heating device according to an example embodiment of the present invention, ammonia, for instance, may be converted by thermolysis into hydrogen and nitrogen. In this connection, the thermal conversion or decomposition of the ammonia may occur at temperatures of approximately 500° C., in the presence of suitable catalysts. For this, for example, iron-based and/or ruthenium-based catalysts may be used. In the case in which, for example, ammonia is generated from a starting substance, in which carbon dioxide and water may be created as by-products, the reaction equilibrium in the thermolysis of ammonia may not be significantly changed hereby. If required, the catalysts to be used for this may be appropriately adjusted.

In addition, non-converted components of the starting substance or of ammonia may not have an undesired effect on a subsequent hydrogen conversion, that may be provided, in a fuel cell system or combustion device according to an example embodiment of the present invention.

In an example embodiment of the present invention, at least one metering element may be provided for metering the automotive fluid to the emission control system and/or to the hydrogen generating unit. With the aid of such a metering element, a separate regulation and/or control of the individual automotive liquid(s) or hydrogen-containing fuel flows may be implemented in dependence upon the requirement of the respective user.

Furthermore, using an appropriate metering element, the automotive liquid generation may be adjusted to the largely independent user, i.e., above all to the emission control system and the hydrogen generating unit For example, a partition of the starting substance stream into at least two partial streams occur with the aid of the appropriately regulated metering element or valve.

The control of the metering element may occur using a control unit in which, for example, the size or quantity of the partial streams may be ascertained, among other things, with the aid of corresponding sensors or consumption rates.

In addition, using the appropriate control unit, a summing formation of the partial streams of the starting substances may be performed, so as to ascertain the overall requirement. At this time, in vehicle applications, it may already be conventional to determine the partial stream for the SCR method according to an algorithm. The partial stream for generating electrical energy may be determined, for example, from the electrical energy requirement of the entire system, or rather, of the vehicle. The latter may have also already become conventional, by using a so-called vehicle electric system management system in current motor vehicles. Consequently, for ascertaining the partial streams or the overall requirement, one may refer to already usual components, whereby an economically favorable example embodiment of the present invention may be implemented.

In a further example embodiment of the present invention, the fuel cell system may be arranged upstream of the emission control system, as seen in the flow direction of the automotive fluid or fuel. The hydrogen generating unit arranged in the flow direction of the automotive fluid, upstream of the fuel cell system, may, on account of this measure, convert, if required, only a certain proportion of the overall automotive fluid flow to a hydrogen-containing fuel flow. Hence, a substance mixture may flow out from the hydrogen generating unit which includes both the automotive fluid or ammonia and the hydrogen-containing fuel in proportions.

A correspondingly operated hydrogen generating unit, in which only a proportional or partial conversion of the automotive fluid occurs, may, for example, be implemented, from a process engineering point of view, compared to an almost complete conversion. Because of this, the hydrogen generating unit may be developed and operated in a manner that may be economically more favorable.

The hydrogen contained in the substances mixture may be converted into electrical energy in the fuel cell system. According to this example embodiment of the present invention, the automotive fluid and the ammonia may subsequently be used in the emission control system, arranged serially downstream from the fuel cell system, for the conversion of the exhaust gas components and for nitrogen oxide reduction.

In an example embodiment of the present invention, the hydrogen utilization unit may be configured as the combustion device. With the aid of this measure, for example, the hydrogen generated may usable for a cold-starting phase and/or a full-load phase of the combustion device. Therefore, environmentally relevant exhaust gas emissions may be reduced in the starting phase and/or in full-load operation.

According to an example embodiment of the present invention, both nitrogen oxide emissions and carbon dioxide emissions may be reduced, for example, by using a so-called APU.

By conversion of the hydrogen-containing fuel from ammonia, a carbon monoxide-poor fuel may be generated. Currently used fuel cells, including low temperature fuel cells such as so-called PEM fuel cells, etc., may have an improved cold-starting behavior but may react to carbon monoxide by impairment of the operation, or rather, by a so-called "poisoning" of the diaphragm. According to an example embodiment of the present invention, costly reforming and/or cleaning methods may not be required for corresponding fuel cell systems. Because of this, the constructive and economic expenditure for putting into use the present invention may become comparatively low.

An exemplary embodiment of the present invention is illustrated in the drawing and is described below with reference to the drawing.

DETAILED DESCRIPTION

Figure 1:
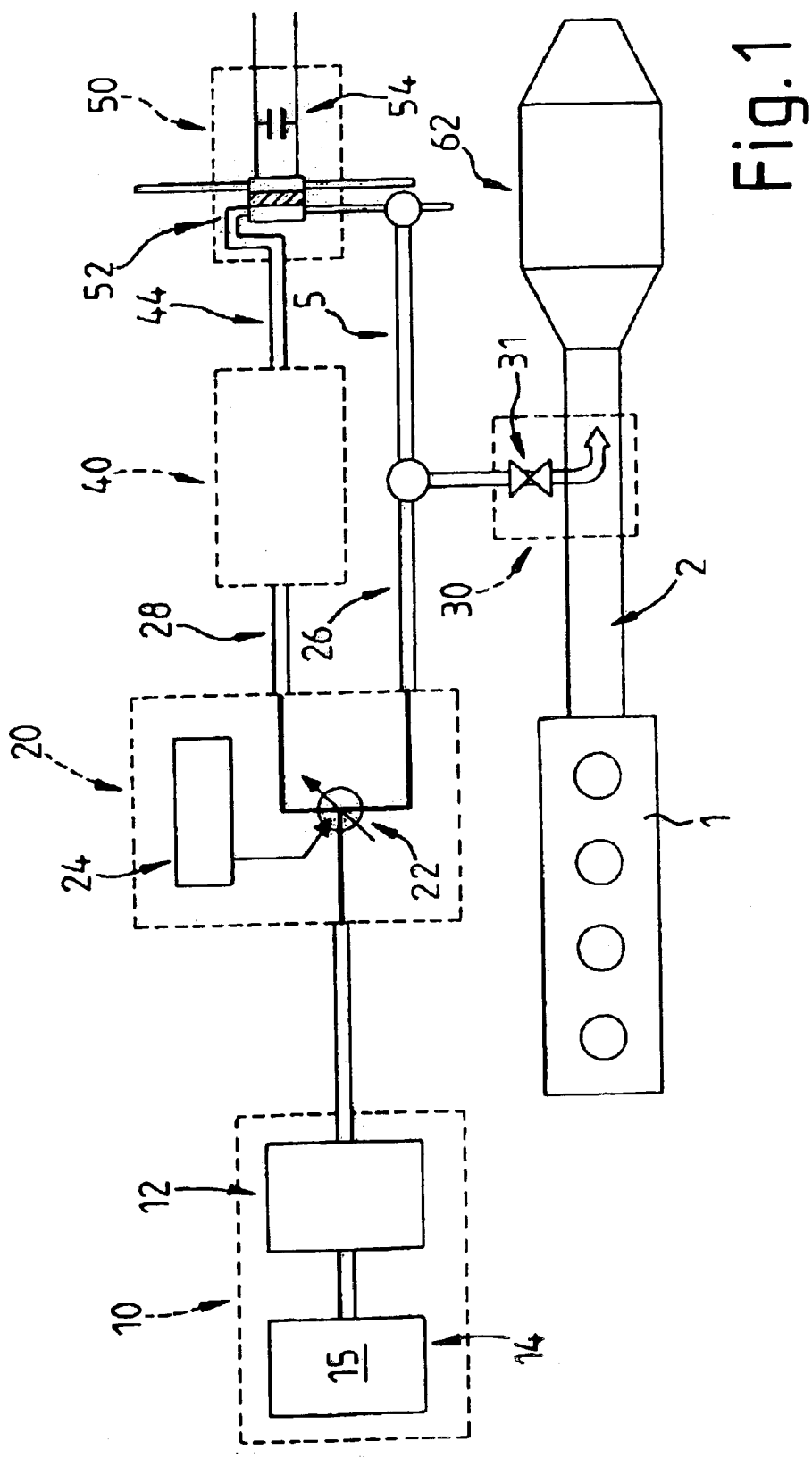
FIG. 1 is schematically a block diagram of a combustion device according to an example embodiment of the present invention.

According to FIG. 1, exhaust gases 2 of an internal combustion engine 1 are nitrogen oxide-controlled, using an SCR catalytic converter 62. To do this, an ammonia stream 26 is metered into exhaust gas stream 2 using an ammonia metering device 30, and may be mixed with it. Metering device 30 includes, in particular, a metering element 31 for setting the amount of ammonia supplied to exhaust gas stream 2. Metering device 30 also includes a mixing unit, so that an almost uniform mixing or turbulence and/or diffusion of ammonia stream 26 with exhaust gas stream 2 may be achieved. The mixing device may, for example, be configured as a so-called static mixer.

In addition to SCR catalytic converter 62, if required, an oxidation catalytic converter may be provided upstream of metering device 30, as seen in the flow direction, and an ammonia blocking catalytic converter is provided post-connected to this.

With the aid of an ammonia generating unit 10, by conversion of a starting substance 15 or first automotive fluid, such as HWL, ammonium carbamate, etc., stored in a reservoir 14, ammonia 26, 28 is generated in a reactor 12. When HWL is used, reactor 12 may be configured as a comparatively simple, heatable container 12.

Besides the chemical conversion of a starting substance 15 for generating the ammonia 26, 28, desorption from ammonia storage media or synthesis as ammonia generating process 10 may also be used.

The ammonia generated using reactor 12 as illustrated in FIG. 1 is divided into the two partial streams 26 and 28, for example, by a regulatable valve 22. Valve 22 may be controlled by using a control unit 24. Control unit 24 is a component of control device 20 which is provided for dividing up the ammonia-containing product stream into partial streams 26 and 28, and, if required, is a component of a vehicle electric system management system that may already be present in vehicles.

Partial stream 28 is supplied to a hydrogen generator 40 and/or to an ammonia engine according to an example embodiment of the present invention. In hydrogen generator 40, ammonia 28 is, above all, converted by thermolysis to hydrogen 44 and nitrogen. Components such as carbon dioxide and/or water, generated by reactor 12 and may also be contained in ammonia stream 28, may not change the equilibrium of the reaction in hydrogen generator 40 significantly. The possibly provided catalytic configuration of hydrogen generator 40 is to be selected appropriately.

In the flow direction after hydrogen generator 40, according to FIG. 1, a fuel cell system 50 is provided for generating electric energy. This includes an electric storage unit 54, for instance, and an accumulator and/or an element having relatively high electrical capacity. For example, in a layout of a system for an operating point at which there is a requirement of ca 0.5 kW in electrical terms, at a fuel cell efficiency of approximately 50%, approximately 2.4 g $NH_3$/min may be made available.

According to an example embodiment of the present invention, fuel cell system 50 may be positioned serially between hydrogen generator 40 and SCR catalytic converter 62. To make this example embodiment of the present invention more clear, connection 5, which is optionally to be provided, is illustrated schematically. In this case, there may be no division of the ammonia-containing substance stream into partial streams 26 and 28 using control device 20, but a metering of the quantity of ammonia stream 28. That is, partial stream 26 is omitted.

The direct coupling of the chemical processes, above all in reactors 12, 40 among each other, and these, in turn, with the two different users 50, 62, having changing dynamics, may require a comparatively high regulating expenditure and, in general, a larger dimensioning of the respective aggregates. For this reason it may be desired to provide appropriate storage elements between the different reactors 12, 40 and between reactors 12, 40 and users 50, 62. To these storage units one may assign, if required, loading and/or unloading devices such as pumps, control or regulating elements, etc. For reasons of clarity, according to FIG. 1, a storage device 54 is illustrated only for current generation 50.

By the combination of several storage units and appropriate regulating strategies, one may uncouple subsystems 10, 20, 40 and 52 from the dynamics of users 50, 62.

By using a hydrogen storage between hydrogen generator 40 and fuel cell system 50, the size and weight of electrical storage 54 may be reduced or it may possibly be completely avoided.

The requirement for ammonia 26 for the SCR method in SCR catalytic converter 62 may be subject to strong temporal fluctuations, because the $NO_x$ quantity in exhaust gas 2 changes, and with that the ammonia requirement within the range of seconds, on account of the dynamics of internal combustion engine 1. In order to implement a system having corresponding ammonia dynamics, quantity metering 30 may be positioned as close as possible to the metering location.

A pressure reservoir, such as, for example, one having a pump, etc., may be positioned upstream of metering device 30, as seen in the flow direction of ammonia stream 26. In corresponding systems having an almost constant pressure level, operation of a gas valve 31, or rather the metering of ammonia stream 26 into exhaust gas 2 may be improved.

To control valve 22 and ammonia generating system 10, the pressure in the pressure reservoir mentioned before may be used as the controlled variable. To do this, one may, connect a pressure sensor of the storage system to control unit 24.

LIST OF REFERENCE NUMERALS 1 combustion engine
2 exhaust gas
5 connection
10 $NH_3$ generator
12 reactor
14 reservoir
15 starting substance
20 control system
22 valve
24 control unit
26 ammonia stream
28 ammonia stream
30 metering device
31 metering element
40 $H_2$ generator
44 hydrogen
50 fuel cell system
52 fuel cell
54 reservoir
62 SCR catalytic converter

What is claimed is:

1. A combustion system for generating energy by combustion of a fuel, comprising:
a combustion device;
an emission control system configured to convert exhaust gas components by an automotive fluid; and
at least one hydrogen generating unit configured to convert the automotive fluid at least partially into a hydrogen-containing fuel;
wherein the automotive fluid at least partially includes ammonia.

2. The combustion system according to claim 1, wherein the combustion device includes at least one of a gasoline engine and a diesel engine.

3. The combustion system according to claim 1, wherein the hydrogen generating unit includes at least one heating device configured to heat the automotive fluid.

4. The combustion system according to claim 1, further comprising at least one metering element configured to meter the automotive fluid to at least one of the emission control system and the hydrogen generating unit.

5. The combustion system according to claim 1, further comprising at least one hydrogen utilization unit configured to utilize the hydrogen-containing fuel.

6. The combustion system according to claim 5, wherein the hydrogen utilization unit includes a separate combustion engine configured to combust the hydrogen-containing fuel.

7. The combustion system according to claim 5, wherein the hydrogen utilization unit includes the combustion device.

8. The combustion system according to claim 5, wherein the one hydrogen utilization unit is configured as a fuel cell system configured to generate electric energy.

9. The combustion system according to claim 8, wherein the fuel cell system is arranged upstream from the emission control system in a flow direction of one of the automotive fluid and the fuel.

10. A combustion system for generating energy by combustion of a fuel, comprising:
   a combustion device;
   an emission control system configured to convert exhaust gas components by an automotive fluid; and
   at least one hydrogen generating unit configured to convert the automotive fluid at least partially into a hydrogen-containing fuel;
   wherein the automotive fluid is at least partially convertible to ammonia.

11. The combustion system according to claim 10, wherein the combustion device includes at least one of a gasoline engine and a diesel engine.

12. The combustion system according to claim 10, further comprising at least one metering element configured to meter the automotive fluid to at least one of the emission control system and the hydrogen generating unit.

13. The combustion system according to claim 10, wherein the hydrogen generating unit includes at least one heating device configured to heat the automotive fluid.

14. The combustion system according to claim 10, further comprising at least one hydrogen utilization unit configured to utilize the hydrogen-containing fuel.

15. The combustion system according to claim 14, wherein the hydrogen utilization unit includes a separate combustion engine configured to combust the hydrogen-containing fuel.

16. The combustion system according to claim 14, wherein the hydrogen utilization unit includes the combustion device.

17. The combustion system according to claim 14, wherein the one hydrogen utilization unit is configured as a fuel cell system configured to generate electric energy.

18. The combustion system according to claim 17, wherein the fuel cell system is arranged upstream from the emission control system in a flow direction of one of the automotive fluid and the fuel.

19. A combustion system for generating energy by combustion of a fuel, comprising:
   a combustion device;
   an emission control system configured to convert exhaust gas components by an automotive fluid;
   at least one hydrogen generating unit configured to convert the automotive fluid at least partially into a hydrogen-containing fuel; and
   at least one automotive fluid generating unit configured to generate the automotive fluid from a starting substance.

20. The combustion system according to claim 19, wherein the starting substance includes at least one of a urea-water solution, urea, ammonium carbamate and isocyanic acid.

21. The combustion system according to claim 19, further comprising at least one storage device configured to store the starting substance.

22. A vehicle, comprising:
   a combustion system configured to generate energy by combustion of a fuel, the system including:
   a combustion device;
   an emission control system configured to convert exhaust gas components by an automotive fluid; and
   at least one hydrogen generating unit configured to convert the automotive fluid at least partially into a hydrogen-containing fuel;
   wherein the automotive fluid at least partially includes ammonia.

23. The vehicle of claim 22, wherein the vehicle is configured as a motor vehicle.

24. A vehicle, comprising:
   a combustion system configured to generate energy by combustion of a fuel, the system including;
   a combustion device;
   an emission control system configured to convert exhaust gas components by an automotive fluid; and
   at least one hydrogen generating unit configured to convert the automotive fluid at least partially into a hydrogen-containing fuel;
   wherein the automotive fluid is at least partially convertible to ammonia.

25. The vehicle of claim 24, the vehicle is configured as a motor vehicle.

* * * * *

UNITED STATES PATENT AND TRADEMARK OFFICE
CERTIFICATE OF CORRECTION

PATENT NO.     : 6,871,491 B2
DATED          : March 29, 2005
INVENTOR(S)    : Norbert Breuer et al.

It is certified that error appears in the above-identified patent and that said Letters Patent is hereby corrected as shown below:

<u>Title page,</u>
Item [57], ABSTRACT,
Line 6, change "by the use of which energy, that" to -- by the use of which energy is generated, that --.

Signed and Sealed this

Sixteenth Day of August, 2005

JON W. DUDAS
*Director of the United States Patent and Trademark Office*